United States Patent [19]

Ayala et al.

[11] Patent Number: 4,952,617

[45] Date of Patent: Aug. 28, 1990

[54] DISPERSION OF PIGMENTS IN RESINS AND COATINGS SYSTEMS

[75] Inventors: Jorge A. Ayala; George A. Joyce, both of Monroe, La.

[73] Assignee: Columbian Chemicals Company, Atlanta, Ga.

[21] Appl. No.: 297,585

[22] Filed: Jan. 17, 1989

Related U.S. Application Data

[63] Continuation-in-part of Ser. No. 118,216, Nov. 16, 1987.

[51] Int. Cl.$^5$ .......................... C08K 3/10; C08K 9/04; C08K 5/05; C08J 3/20
[52] U.S. Cl. ..................................... 523/200; 106/189; 106/195; 106/237; 106/419; 106/425; 106/429; 106/456; 106/459; 106/460; 523/206; 523/456; 523/459; 523/511; 523/516; 524/269; 524/386; 524/388; 524/431; 524/435; 524/586
[58] Field of Search ............... 523/200, 206, 459, 456, 523/511, 516; 524/269, 386, 388, 431, 435, 586, 389; 106/419, 425, 456, 459, 460, 429, 189, 195, 237

[56] References Cited

U.S. PATENT DOCUMENTS

| 3,076,719 | 2/1963 | Whately et al. | 106/447 |
|---|---|---|---|
| 4,007,051 | 2/1977 | Gombar . | |
| 4,217,265 | 8/1980 | Dietz et al. | 524/168 |
| 4,230,501 | 10/1980 | Somerset et al. | 106/502 |
| 4,299,743 | 11/1981 | Pierce et al. | 524/590 |
| 4,357,170 | 11/1982 | Brand | 106/448 |
| 4,420,340 | 12/1983 | Mohr et al. | 524/413 |
| 4,510,302 | 4/1985 | Kolb et al. | 524/548 |
| 4,599,114 | 7/1986 | Atkinson | 106/448 |
| 4,681,637 | 7/1987 | Rademachers et al. | 106/425 |
| 4,798,856 | 1/1989 | Ayala et al. | 524/386 |

FOREIGN PATENT DOCUMENTS

3409722 9/1985 Fed. Rep. of Germany .

OTHER PUBLICATIONS

Chemical Abstracts 109:171451w, 1988, "Role of Active Functional Groups and Conformation of Adsorbed Molecules in the Dispersibility of Magnetic Particles".
Chemical Abstracts 87:137423f, 1977, "Easily Dispersible, Transparent Iron Oxide Pigments".
Chemical Abstracts 61804a, 1975, "Improvement of the Dispersibility of Red Iron Oxide Pigment".
Chemical Abstracts 107:219154, 1987, "Surface Treatment of Pigments".
Chemical Abstracts 109:172142h, 1988, "Pigment Dispersion".
Schrodeder, "Pigment Surface Coating," European Coatings Journal, 1988.
Chemical Abstracts 97:7335z, 1982, "Titanium Dioxide Pigments for Polymer Compositions".
Chemical Abstracts 94:5007h, 1981, "Red Iron Oxide Pigments".
Chemical Abstracts 90:40263c, 1979, "Polyreactions at Pigment Surfaces".

Primary Examiner—Herbert J. Lilling
Attorney, Agent, or Firm—Jones, Askew & Lunsford

[57] ABSTRACT

A pigment dispersion of enhanced viscosity and heat stability characteristics for use in coating systems is provided. The pigment dispersions generally comprise a pigment carrier, a pigment of the type having a hydrophilic surface, and a surfactant functional as a dispersant in a relatively non polar matrix and which is present on the surface of the pigment in an effective amount. Pigment carriers include water-based carriers and organic solvent-based carriers. Finished coatings having improved viscosity and heat stability are also provided. The finished coatings comprise a coating base and the surfactant treated pigments. Such pigments include iron oxide pigments yellow iron oxide pigment, black iron oxide pigment, divalent ferrite pigments, zinc ferrite pigment, and magnesium ferrite pigment. Such surfactants include trimethylol propane, and trimethylol ethane.

7 Claims, 3 Drawing Sheets

DISPERSION OF PIGMENTS IN RESINS AND COATINGS SYSTEMS

CROSS REFERENCE

This application is a continuation-in-part of application Ser. No. 07/118,216 filed Nov. 16, 1987.

FIELD OF THE INVENTION

This invention relates generally to inorganic pigments, and more particularly relates to inorganic pigments for use in concentrates for plastics and dispersions for coatings systems.

BACKGROUND OF THE INVENTION

Inorganic pigments such as iron oxides are commonly used in coloring plastics, such as low density polyethylene, by incorporation of the pigment with the resin by intensive mixing, such as by compounding in a Banbury or two-roll mill, or less intensive mixing such as twin-screw preplasticizing followed by extrusion, injection molding, or film blowing. A key performance property of the pigment is the dispersibility of the pigment in the resin, which is a measure of the ease with which the pigment can be intimately mixed with the resin. Large aggregates of undispersed pigment can cause surface specks, poor gloss, and color streaks on molded parts as well as being readily visible, and can cause weak spots and holes in blown film.

A pigment concentrate can be prepared by mixing a carrier resin, usually the same as or at least compatible with the eventual matrix resin, and the pigment at a loading of typically 40 to 50% in a Banbury or two-roll mill, followed by pelletizing. Later in use, the pigment is let down from the pigment loading to a concentration in the matrix resin of typically 5% or less, by mixing the concentrate with the matrix resin during melt processing, such as by extrusion or injection molding.

Additionally, in compounding and processing plastics, the material about to be extruded is normally passed through a screen to remove coarse particles. Large amounts of agglomerates will cause rapid screen blockage leading to low process throughputs and excessive equipment down time for screen replacement.

Several tests are used to determine pigment dispersion in a carrier resin. In the screen life test, compound is extruded through a screen, typically 150 or 325 mesh, and the time is measured until a predetermined pressure drop across the screen is achieved. This time represents screen life, with increasing time being desirable.

Another pigment dispersion test is the film quality test, which involves compounding pigment in resin, then letting down the concentrated compound in an extruder, and then blowing film from the extrudate. The film, typically 1 to 2 mils in thickness, can be visually examined for specks of undispersed pigment.

Also, X-radiography can be used to examine plaques of pigment concentrates to detect areas of insufficient pigment dispersion. On the radiograph, agglomerates of undispersed inorganic pigment, which have relatively high specific gravity, show as dark specks.

Inorganic pigments such as iron oxides and ferrites are also commonly used in coatings systems. Coatings systems include both finished coatings, such as paints, and pigment dispersions such as colorants or millbase formulations. Finished coatings may be directly applied to wood, metallic, or ceramic surfaces and may be water based or solvent based. Pigment dispersions for coatings generally comprise a pigment carrier and a relatively high concentration of pigment dispersed therein. High concentration pigment dispersions are eventually mixed with coating bases to form finished coatings. The pigment carriers are preferably of a type which is compatible with both water-based and organic solvent-based coatings systems. A pigment dispersion which is compatible in both water-based and organic solvent-based coatings systems is called a "universal" pigment colorant.

A particular problem with inorganic pigments is that inorganic pigments do not disperse well in coatings systems. One reason that inorganic pigments do not disperse well in coatings systems is that the polar surfaces of metallic oxide pigments are not compatible with most pigment carriers and coating bases. The dispersibility of inorganic pigments in coatings systems is very important, because a pigment which is difficult to disperse in coatings systems results in more costly coatings systems due to the additional time and energy required to properly mix the pigment into the coatings systems.

The increase in viscosity imparted by pigments to coatings systems is also important. Metallic oxide pigments tend to significantly increase the viscosity of coatings systems. Pigments which significantly increase the viscosity of coatings systems further increase the cost of mixing the coatings systems. The dispersibility of pigments and the viscosity increase imparted by pigments is especially important when preparing pigment dispersions for coatings.

A maximum loading of pigment in a dispersion is desirable for maximum efficiency of the pigment dispersion. The amount of pigment which can be efficiently mixed with a pigment carrier depends on the dispersibility of the pigment in the pigment carrier and the increase in viscosity imparted to the pigment carrier by the pigment. High loadings can not be obtained with pigments such as metallic oxides which are difficult to disperse and impart a significant increase in viscosity to most pigment carriers.

Another problem with inorganic pigments such as metallic oxides is that they are not color stable at all temperatures. Considerable color shifts can be observed in metallic oxides such as iron oxides at high temperatures, and result in undesirable discoloration of coatings and complete color changes such as from yellow to red.

Surfactants generally have been used to enhance the processing of inorganic pigments in various respects. The following patents are typical.

U.S. Pat. No. 4,599,114 issued July 8, 1986, to Atkinson for "Treatment of Titanium Dioxide and Other Pigments to Improve Dispersibility" discloses the use as a surfactant of the reaction product of a diamine, a carboxylic acid, and a fatty acid to improve dispersibility of titanium dioxide pigment in a resin medium.

U.S. Pat. No. 4,277,288 issued July 7, 1981, to Lawrence for "Fluidized Granulation of Pigments Using Organic Granulating Assistant" discloses the use of high boiling organic surfactants to promote agglomeration of pigment particles prior to dispersing the pigment in the final application medium.

U.S. Pat. No. 4,681,637 issued July 21, 1987 and assigned to Bayer AG, for "Process to Make Yellow-Brown Zinc Ferrite Pigments" discloses the use of trimethylol propane and methylhydrogen polysiloxane as grinding agents for zinc ferrites to improve color values and dispersibility.

U.S. Pat. No. 4,230,501 issued Oct. 28, 1980, to Howard et al for "Pigments Dispersible in Plastics" discloses pigments mixed with waxy materials to promote dispersibility of pigment concentrate in thermoset and thermoplastic resins.

SUMMARY OF THE INVENTION

It is an object of the invention to provide a surface modifying treatment for inorganic pigments to promote dispersibility and heat stability in resins and coatings systems.

It is another object to provide a pigment concentrate of enhanced dispersibility and heat stability in plastics, the pigment concentrate including a dispersion in a resin carrier of inorganic pigment of the type having a hydrophilic surface and a surfactant on the surface of the pigment which is functional as a dispersant and which is present in an effective amount.

It is another object to provide such pigment concentrates having a substantially improved extrusion screen life.

It is another object to provide an iron oxide pigment concentrate of such enhanced dispersion characteristics in thermoplastics.

It is another object to provide a divalent ferrite pigment concentrate of such enhanced dispersion characteristics in thermoplastics.

It is another object of the present invention to provide a pigment concentrate of enhanced viscosity and heat stability characteristics for use in coatings systems, the pigment concentrate including a dispersion in a pigment carrier of an inorganic pigment of the type having a hydrophilic surface and a surfactant on the surface of the pigment which is functional as a dispersant and which is present in an effective amount.

It is a further object of the present invention to provide an iron oxide pigment dispersion of such enhanced viscosity and heat stability characteristics for use in coating systems.

Accordingly, there is provided a pigment concentrate dispersible in plastics and having a substantially improved characteristic extrusion screen life, comprising a dispersion in a resin carrier of an inorganic pigment of the type having a hydrophilic surface, and having on its surface in an effective amount a surfactant of the type characterized by an attached polar terminus, in relation to the surface of the pigment, and a nonattached nonpolar terminus, in relation to the carrier resin, or a surfactant of the type characterized by a high molecular weight surface blocking agent.

Such concentrates for plastics are further characterized by a characteristic extrusion screen life which is substantially increased over that of a substantially similar comparison concentrate but not having the surfactant.

Such pigments for concentrates dispersible in plastics include iron oxide pigments, yellow iron oxide pigment, black iron oxide pigment, divalent ferrite pigments, zinc ferrite pigment, and magnesium ferrite pigment. Representatively, the pigments have a BET surface area of about 3 to 20 square meters per gram.

Such surfactants for concentrates dispersible in plastics include dimethyl polysiloxane, isopropyl triisostearoyl titanate, trimethylol ethane, trimethylol propane, and low molecular weight polyethylene. Representative treatment levels are about 0.1 to 1.0% by weight of the pigment.

Preferred plastic resins include polyethylene, polypropylene, polystyrene, acrylonitrile-butadiene-styrene copolymer, polyvinyl chloride, and polyethylene terephthalate.

In a preferred concentrate for plastics, pigment loading is about 50%, the pigment comprises red iron oxide, the carrier comprises low density polyethylene, and the surfactant comprises trimethylol propane or trimethylol ethane with a treatment level of about 0.5% by weight of pigment.

There is also provided a pigment dispersion of enhanced viscosity and heat stability characteristics for use in coatings systems, the pigment dispersion comprising a pigment carrier, a pigment of the type having a hydrophilic surface dispersed in the pigment carrier, and a surfactant which is functional as a dispersant in a relatively non-polar matrix and which is present on the surface of the pigment in an effective amount and which enhances the dispersibility of said pigment.

Such pigment carriers for dispersions for use in coatings systems include water-based carriers such as polyhydric alcohols and organic solvent-based carriers such as acrylic resins, silicone resins, alkyd resins, epoxy resins, polyurethane resins, phenolic resins, nitrocellulose, natural oils, cellulose acetate, cellulose acetate butyrate, and the like.

Such pigments for dispersions for use in coatings systems include iron oxide pigments such as red iron oxide, yellow iron oxide, and black iron oxide, and divalent ferrite pigments such as zinc ferrite and magnesium ferrite. Representatively, the pigments have a BET surface area of about 3 to about 20 square meters per gram.

Such surfactants for dispersions for use in coatings systems include surfactants of the type which comprise an attached polar terminus, in relation to the surface of the pigment, and a nonattached nonpolar terminus, in relation to said pigment carrier, such as trimethylol ethane and trimethylol propane. Representative treatment levels are about 0.1 to about 1% by weight of pigment.

There is also provided a finished coating having improved viscosity and heat stability comprising a coating base, a pigment of the type having a hydrophilic surface dispersed in said coating base, and a surfactant which is functional as a dispersant in a relatively non-polar matrix and which is present on the surface of the pigment in an effective amount. Such a finished coating is preferably prepared by mixing appropriate pigment dispersions of the present invention with such coating bases. Such coating bases include latex systems, alkyd resins, polyurethane resins, silicone resins, acrylic resins, phenolic resins, nitrocellulose, epoxy resins, cellulose acetate, cellulose acetate butyrate, and the like. The same pigments and surfactants which are described hereinabove as appropriate for use in the pigment dispersions for coatings systems are also appropriate for use in the finished coatings.

Additionally, the invention comprehends such treated pigments having enhanced dispersibility in plastics and coatings systems and processes by which such surfactant treated pigments are made.

The pigment particles treated with surfactant are easily dispersed in the coatings systems of the present invention and tend to increase the viscosity of the coatings systems to a lesser degree than the untreated pigments. Accordingly, the time and energy required to prepare the coatings systems of the present invention are reduced, thereby reducing the cost of preparing the coatings systems of the present invention. Further, because the pigment particles treated with surfactant are easily dispersed and tend to increase viscosity to a lesser degree, greater amounts of the surfactant treated pigment particles can be loaded in pigment dispersions than untreated pigments. Accordingly, the present invention provides for the more efficient production and use of pigment dispersions. In addition, the pigment particles treated with surfactant are more heat stable in the coatings systems of the present invention than the untreated pigments. Therefore, the coatings systems of the present invention retain the original color imparted by the pigment over a wider temperature range.

Other features, objects, and advantages of the invention will become apparent from the following detailed description, drawings, and claims.

DETAILED DESCRIPTION OF THE INVENTION

Figure 1:
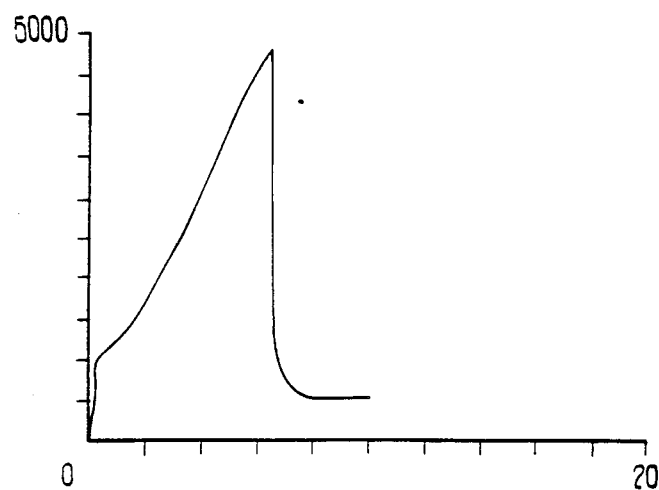
FIG. 1 illustrates the results of a screen life test for red iron oxide pigment without surface modifying treatment, in accordance with conventional practice, compounded in 50% low density polyethylene.

Pigment particles treated with surfactant in accordance with the present invention may be advantageously added to essentially any plastic or resin, including rubber compounds, such as by adding the treated pigment particles to the plastic while the plastic is in a liquid or compoundable form. Pigment particles treated with surfactant in accordance with the present invention may also be advantageously added to pigment carriers to form pigment dispersions and to coating bases to form finished coatings such as paints, lacquers, film bonding coatings, primers, and powder coatings.

Resins For Concentrates Dispersible in Plastics and Elastomeric Compositions Suitable plastics and resins for use in concentrates dispersible in plastics and elastomeric compositions include thermoplastic and thermosetting resins, rubber compounds, and thermoplastic elastomers. These plastics and resins containing the treated pigment particles of the invention may be utilized in molding processes, such as extrusion, injection, calendaring, casting, compression, lamination, and transfer molding, and in inks, dyes, tints, impregnations, adhesives, caulks, sealants, rubber goods, and cellular products.

By way of example, suitable plastics and resins for use in concentrates dispersible in plastics and elastomeric compositions include alkyd resins, oil modified alkyd resins, unsaturated polyesters, natural oils, epoxides, nylons, thermoplastic polyesters, polycarbonates, polyethylenes, polybutylenes, polystyrenes, styrene butadiene copolymers, polypropylenes, ethylene-propylene co- and terpolymers, silicone resins, natural and synthetic rubbers, acrylics, phenolic resins, polyoxymethylene, polyurethanes, polysulfones, polysulfide rubbers, nitrocelluloses, vinyl butyrates, vinyls, ethyl cellulose, cellulose acetates and butyrates, viscose rayon, shellac, waxes, ethylene copolymers, such as ethylene-vinyl acetate, ethylene-acrylic acid, and ethylene-acrylate copolymers, and the like.

Plastics and resins for use in concentrates dispersible in plastics and elastomeric compositions which are of special interest are high density, low density, and linear low density polyethylenes, polypropylenes, polystyrenes, acrylonitrile-butadiene-styrene copolymer, polyvinyl chloride, and polyethylene terephthalate.

Pigment Carriers and Coating Bases

Suitable coating bases for making the finished coatings of the present invention include water soluble coating bases such as latex systems, and organic solvent coating bases such as alkyd resins, polyurethane resins, acrylic resins, silicone resins, phenolic resins, nitrocellulose, epoxy resins, cellulose acetates and butyrates, natural oils and the like. Suitable pigment carriers for making pigment dispersions of the present invention include universal pigment carriers such as polyhydric alcohols which are compatible with both water-soluble and organic solvent coatings bases, and pigment carriers which are compatible with solvent-based organic coatings such as acrylic resins, silicone resins, alkyd resins, epoxy resins, polyurethane resins, nitrocellulose, cellulose acetates and butyrates, natural oils and the like. The surfactant treated pigments of the present invention are compounded in the pigment carriers and coating bases with conventional mixing methods.

Pigments

Types of pigments which benefit from the treatment of the present invention include red iron oxides (alpha ferric oxide) which, for example, are typically produced by thermal decomposition of ferrous sulfate. These red iron oxides are commonly referred to as copperas reds. Red iron oxides are also conventionally produced by other processes including dehydration of yellow iron oxide (goethite), calcination of magnetite, and direct precipitation.

Other inorganic pigments are within the scope of this invention including yellow iron oxide (goethite), black iron oxide (magnetite), and zinc and magnesium ferrites. Such pigments possess hydrophilic surfaces.

Zinc ferrites (such as commercial pigment grade Mapico Tan 10A from Columbian Chemicals Company) are typically produced by processes as disclosed in U.S. Pat. Nos. 2,904,395 and 4,222,790. These zinc ferrites show greatly improved dispersibility in plastics when treated in accordance with this invention as discussed below.

Representatively, pigments within the scope of this invention have surface areas of about 3 to 20 square meters per gram as determined by the conventional BET method, and have a typical particle shape that is generally acicular, spheroidal or cubical.

Surfactants

It is believed that suitable surfactants for the surface treatments of this invention block active sites on the pigment surface which prevent the wetting of the pigment by nonpolar matrices. In other words, specific active sites, which are probably of high polarity, make the pigment surface incompatible with low polarity or nonpolar matrices. By covering or by attaching a molecule to such active sites, the compatibility of the pigment with a relatively low polarity or nonpolar matrix is highly increased.

Thus, a suitable surfactant will attach with a high specificity to such active sites. Conversely, the free end of the surface treating agent which is not attached to the surface of the pigment must be a low polarity moiety. Representatively, titanate coupling agents, dimethyl polysiloxanes, trimethylol ethane and trimethylol propane act in this manner. Trimethylol ethane and trimethylol propane are particularly preferred surfactants for pigments which are used in coatings systems.

As discussed below in connection with Example 2 and 3 and FIGS. 2 and 3, the outstanding performance of trimethylol ethane and trimethylol propane relates to its highly polar (three hydroxyls) terminus attaching firmly to the oxide surface and leaving the short alkane moiety protruding therefrom and available for improvement of compatibility with a nonpolar matrix, such as polyolefin.

Figure 9:
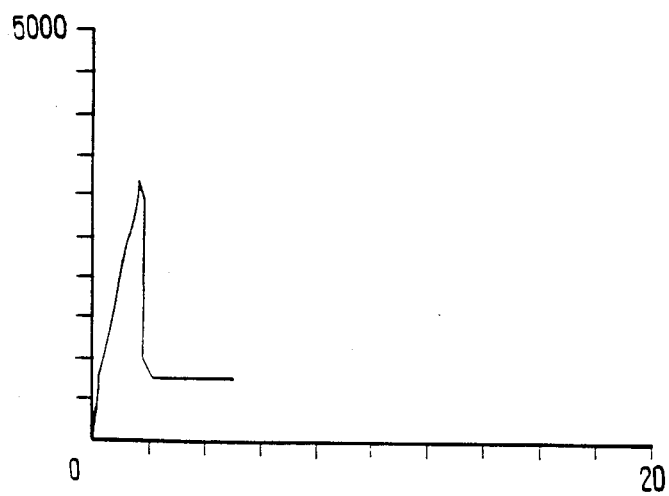
FIG. 9 illustrates screen life testing for tan zinc ferrite pigment, treated with 1% pentaerythritol and compounded in 50% low density polyethylene.

On the other hand, as discussed below in connection with Example 9 and FIG. 9, the poor performance of pentaerythritol relates to a surface treatment in which the surfactant attaches to the surface of the pigment, but the nonattached moiety is polar. Pentaerythritol attaches to the iron oxide in substantially the same manner as trimethylol propane or trimethylol ethane. However, the nonattached moiety in the case of pentaerythritol is a polar OH group which causes a negative effect on the dispersion of iron oxide in polyethylene.

Other suitable surfactants for pigments which are compounded into plastics or elastomeric compositions are of high molecular weight and will cover the entire surface of the pigment. Thus, by covering the entire surface, the active sites are blocked. If the high molecular weight agent is highly nonpolar, it will increase the compatibility of the pigment with low or nonpolar matrices. Representatively, low molecular weight polyethylene (Example 5) acts in this manner in the treatment of iron oxides. Low molecular weight polyethylenes, also termed polyethylene waxes, are commercially available as A-C polyethylene from Allied Corporation. Preferably, the low molecular weight polyethylene is of the emulsifiable type.

Surface treatment methods within the scope of the invention include incorporating the surfactant into a pigment slurry prior to drying, treatment of dried pigments prior to milling, and intensive mixing with finished pigment.

The lower quantity of additive to be effective is that amount which produces a monolayer coverage of the pigment surface. The upper effective quantity accounts for occurrence of excess additive which could volatilize in compounding, migrate in films or cause pigment flocculation. It has been found that treatment levels of 0.1 to 1.0% by weight give excellent performance for pigments with surface areas of about 3 to 20 square meters per gram. Most preferred is a treatment level in the range of about 0.3 to 0.5%.

In Examples 1-9 discussed below, comparative testing was conducted for the effect on extrusion screen life for pigment concentrate versus pigment surfactant treatment. Examples 1-9 involve concentrates for use in plastics and elastomeric compositions. Generally, the test procedure involves 3 steps. First, pigment is surfactant treated (except for the control specimen). Second, a pigment-thermoplastic concentrate is prepared. Third, the concentrate is tested for extrusion screen life.

In the Figures, the numbering of the figures corresponds to the numbering of the Examples. Thus, FIG. 1 illustrates the results of Example 1. The Figures are x-y charts of the screen life testing in which the ordinate represents extrusion back-pressure and is scaled to 5000 psi, and the abscissa represents time elapsed during the pressure buildup. During each test, pressure buildup was monitored for up to 20 minutes.

EXAMPLE 1

FIG. 1 illustrates the results of Example 1 which refers to the control example in which red iron oxide pigment was not treated with a surfactant and was prepared in conventional manner. Pigment concentrate was prepared by compounding red iron oxide pigment in low density polyethylene at a 50% pigment loading. The red iron oxide was commercial pigment grade R297 from Columbian Chemicals Company. The low density polyethylene was further characterized as having a Melt Index of 10.0.

The red pigment powder was compounded with low density polyethylene in a conventional manner. First, the pigment powder was compounded with low density polyethylene granules in equal weight portions by mixing in a Banbury mill, beginning at a starting temperature of about 100° F. and reaching a final temperature of about 240° F. Then, the preliminary compound was subjected to 2 passes through a conventional two-roll mill of size 8×18 inches and at a roll spacing of about 0.070 inches and a roll temperature of about 150° F. Finally, the resulting rolled concentrate was granulated in a Plasto grinder. The concentrate was further characterized by a Melt Flow of 62.8, as determined in accordance with test procedure ASTM D1238- Condition N.

Then, the control concentrate of Example 1 was subjected to screen life testing. In the conventional procedure for determining screen life, the granulated thermoplastic concentrate is screw extruded through a 150 mesh screen while monitoring the back-pressure buildup. Extrusion screw speed is about 100 rpm and extrusion die temperature is about 163° C. The extrusion screen is located just down course of the die and is backed by a breaker plate of relatively large diameter holes and an 80 mesh backing screen. Generally, as agglomerates of the dispersed phase are accumulated on the extrusion screen, resistance to extrusion flow increases. Test screen life is equated to the time required to develop a back-pressure of 3000 psi. For the control concentrate, FIG. 1 shows a screen life to 3000 psi of about 4 minutes. Pressure continued to increase steeply and at 7 minutes had reached 5000 psi at which time the extruder was stopped.

EXAMPLES 2 TO 5

These are positive examples showing substantial improvement over the control Example 1. The same procedures were followed for preparing and testing red iron oxide pigment concentrated in low density polyethylene, except that the pigment powder was preliminarily surfactant treated with the intent to improve the dispersion of pigment in the low density polyethylene carrier resin. Generally, the more uniform the dispersion, the less likely that there will be agglomerates or clusters of the dispersed phase, and the less likely that extrusion screening will be obstructed.

Figure 2:
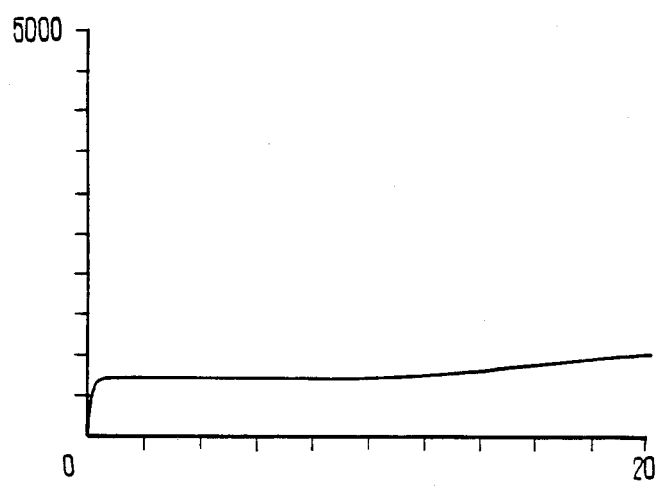
FIG. 2 illustrates screen life testing for red iron oxide pigment, treated with 0.5% trimethylol propane and compounded in 50% low density polyethylene.

FIG. 2 shows a dramatic flattening of the screen life curve for red iron oxide pigment treated with 0.5% trimethylol ethane, and compounded in 50% low density polyethylene. In the surfactant treatment, the trimethylol ethane was preliminarily dissolved in water at a concentration of about 80 and added to the dry pigment. The pigment and the diluted trimethylol ethane were vigorously mixed in a Henschel mixer after a nitrogen purge. No further drying of the pigment was necessary. It is seen from the substantially flat pressure-time profile of FIG. 2 that screen life is extended indefinitely.

The surfactant in each of these examples was added on the basis of weight percentage of the pigment charged to the mixer. For example, for a charge of 2000 grams of pigment, about 20 grams of surfactant mixed with the pigment represents a 1% treatment.

Figure 3:
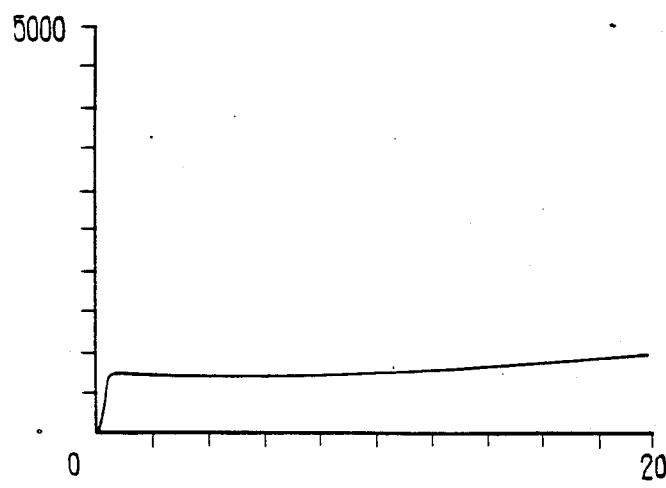
FIG. 3 illustrates screen life testing for red iron oxide pigment, treated with 0.5% trimethylol propane and compounded in 50% low density polyethylene.

FIG. 3 shows a dramatic flattening of the screen life curve for red iron oxide pigment treated with 0.5% trimethylol propane, and compounded in 50% low density polyethylene. The trimethylol propane was preliminarily dissolved in water at a concentration of about 80% and added to the dry pigment and blended in a Henschel mixer. No further drying of the pigment was necessary. It is seen from the substantially flat pressure-time profile of FIG. 3 that screen life is extended indefinitely.

Figure 4:
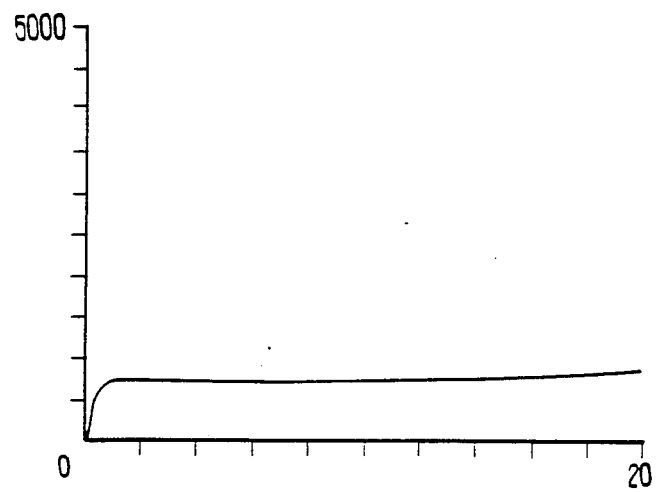
FIG. 4 illustrates screen life testing for red iron oxide pigment, treated with 1% silicone surfactant and compounded in 50% low density polyethylene.

FIG. 4 also shows a dramatic flattening of the screen life curve for red iron oxide pigment treated with 1% dimethyl polysiloxane, and compounded in 50% low density polyethylene. The silicone surfactant was added directly to the dry pigment and blended in a Henschel mixer. It is seen from the substantially flat pressure-time profile that screen life is extended indefinitely.

Figure 5:
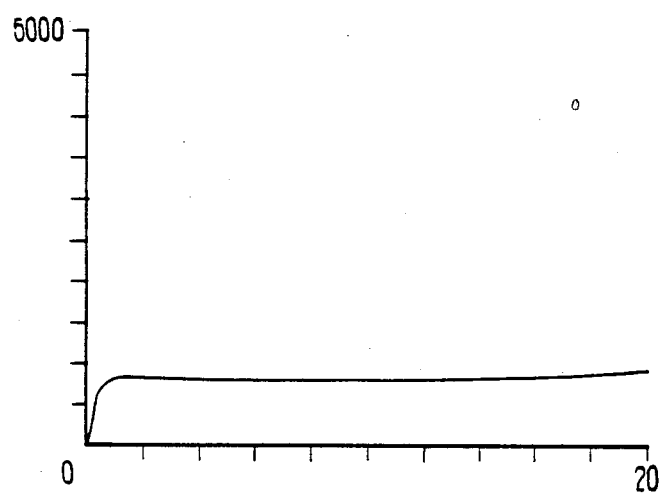
FIG. 5 illustrates screen life testing for red iron oxide pigment, treated with 1% low molecular weight polyethylene and compounded in 50% low density polyethylene.

FIG. 5 illustrates screen life testing for red iron oxide pigment treated with 1% low molecular weight polyethylene, and compounded in 50% low density polyethylene. As discussed above, this surfactant is of the high molecular weight type. The 1% low molecular weight polyethylene was added to the pigment in emulsion form which contained about 30% polyethylene. Then, the pigment was dried prior to compounding. It is seen from the substantially flat pressure-time profile that screen life is extended indefinitely.

EXAMPLE 6

Figure 6:
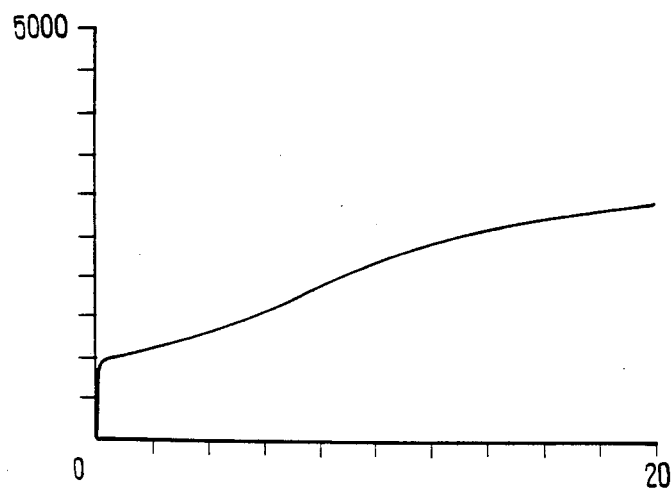
FIG. 6 illustrates screen life testing for tan zinc ferrite pigment without surface modifying treatment, in accordance with conventional practice, compounded in 50% low density polyethylene.

This is a control Example, relative to the following examples, for tan zinc ferrite pigment compounded in 50% low density polyethylene, which was conducted in a substantially similar manner to the control Example 1 except that screen life testing was through 325 mesh screen. The pigment was grade Mapico Tan 10A from Columbian Chemicals Company. For this control concentrate, FIG. 6 shows a screen life to 3000 psi of about 20 minutes.

EXAMPLES 7 AND 8

These are positive examples showing substantial improvement over the control Example 6. The foregoing procedures were followed for preparing and testing tan zinc ferrite pigment concentrated in 50% low density polyethylene, except that screen life testing was through 325 mesh screen.

Figure 7:
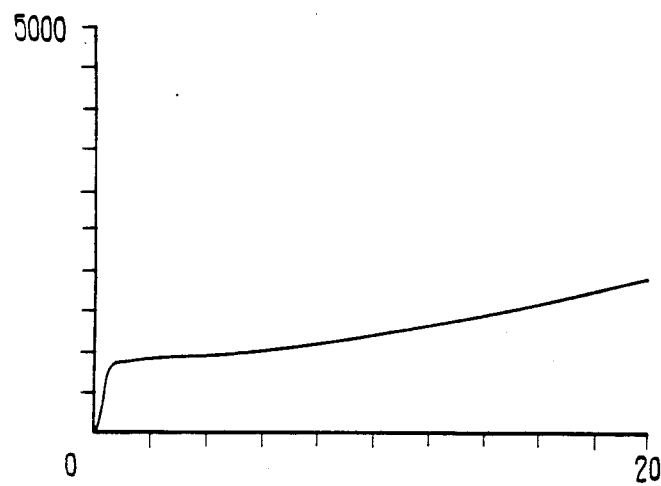
FIG. 7 illustrates screen life testing for tan zinc ferrite pigment, treated with 1% trimethylol ethane and compounded in 50% low density polyethylene.

FIG. 7 shows a substantial improvement of the screen life curve for tan zinc ferrite pigment treated with 1% trimethylol ethane, and compounded in 50% low density polyethylene. The trimethylol ethane was preliminarily dissolved in water at a concentration of about 80% and added to the dry pigment and blended in a Henschel mixer. No further drying fo the pigment was necessary. It is seen from the pressure-time profile that screen life is extended substantially. The linearly extrapolated screen life to 3000 psi is about 31 minutes.

Figure 8:
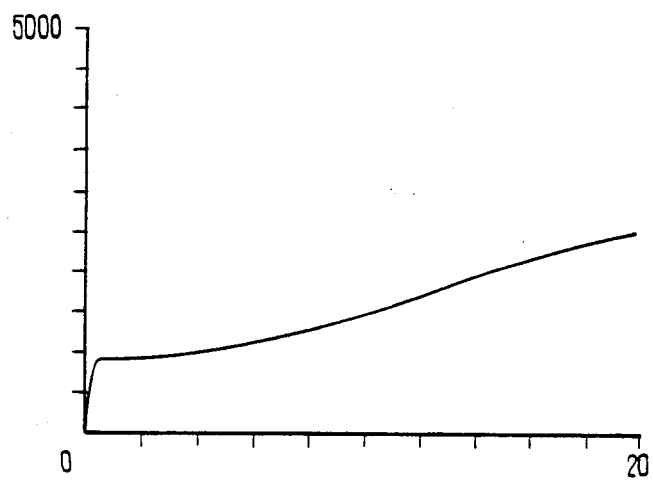
FIG. 8 illustrates screen life testing for tan zinc ferrite pigment, treated with 1% titanate surfactant and compounded in 50% low density polyethylene.

FIG. 8 shows a substantial improvement of the screen life curve for tan zinc ferrite pigment treated with 1% isopropyl triisostearoyl titanate, and compounded in 50% low density polyethylene. The titanate surfactant is commercially available as Kenrich TTS. The titanate surfactant was added directly to the dry pigment and blended in a Henschel mixer. The surfactant was added on the basis of weight percentage of the pigment charged to the mixer. It is seen from the pressure-time profile that screen life is extended substantially. The linearly extrapolated screen life to 3000 psi is about 28 minutes.

EXAMPLE 9

This example is a negative example showing a substantial decrease in dispersibility relative to the control Example 6. The surfactant was 1% pentaerythritol dissolved in about 175 milliliters of water. The poor performance of pentaerythritol relates to its nonattached polar moiety, a polar OH group, which causes a negative effect on the dispersion of iron oxide in polyethylene.

Examples 10-24 hereinbelow involve the addition of surfactant treated pigments to coatings systems.

EXAMPLE 10

A solution comprising water and trimethylol ethane (TME) was made and added to Mapico Black iron oxide powder from Columbian Chemicals Company in a Henschel mixer. After a uniform blend was achieved, the water was gently driven off by heating in an oven at about 75° C. Enough trimethylol ethane solution was added to the iron oxide to produce a dry trimethylol ethane coated iron oxide comprising about 0.5% of trimethylol ethane by weight. An alkyd millbase formulation comprising the treated Mapico Black iron oxide was prepared. A pigment carrier was prepared by mixing 82.5 gm. of styrenated alkyd resin #5367 from Cargill, Inc., 15.5 gm. of xylene, 1.0 gm. of Exkin #2 antiskinning agent from Nuodex, Inc., and 1.0 gm. of a naphthenate drier in a Cowles mixer for one hour. 0.5 gm. of the treated iron oxide pigment was dispersed in 3 ml. of the alkyd resin pigment carrier using an automatic muller from Hoover Brothers to form the millbase formulation.

EXAMPLES 11-13

Three separate alkyd millbase formulations were prepared according to the same procedure outlined in Example 10 except that samples of untreated Mapico Black iron oxide from Columbian Chemicals were used.

Draw-downs of the four prepared alkyd millbase formulations from Examples 10-13 were prepared and placed in an oven for 16 hours at 200° F. After the heat treatment, the heated draw-downs were compared to unheated draw-downs using a CompuScan spectrophotometer reading in Hunter units.

The data from the spectrophotometer is shown in Table 1. LD is lightness/darkness, RG is redness/greenness, YB is yellow/blueness, and ΔE is the total color change. The total color change for the pigment millbase formulations containing the trimethylol ethane treated iron oxide is significantly lower than that of the three other pigment millbase formulations containing untreated iron oxide indicating that the trimethylol ethane imparts greater heat stability to the iron oxide.

TABLE 1

| | | Spectophotometer Data | | | |
|---|---|---|---|---|---|
| | | ΔE | LD | RG | YB |
| Ex. 7 | Iron oxide with 0.5% trimethylol ethane | 0.1 | 0.1 | 0.0 | 0.1 |
| Ex. 8 | Untreated iron oxide | 0.6 | 0.5 | 0.3 | 0.1 |
| Ex. 9 | Untreated iron oxide | 0.5 | 0.3 | 0.5 | −0.1 |
| Ex. 10 | Untreated iron oxide | 0.5 | 0.4 | 0.3 | 0.1 |

EXAMPLE 14

A silicone millbase formulation was prepared by mixing 300 grams of SR-240 silicone resin from General Electric, 100 gm. of Mapico Tan 10A zinc ferrite pigment from Columbian Chemicals Company, and 400 gm. of glass beads in a quart can sand mill mixer at 5000 rpm for 20 minutes. The silicone millbase formulation was then reduced with about 20% by volume of xylene. The reduced silicone millbase formulation was sprayed onto a steel panel and cured at 300° F. for 15 minutes.

EXAMPLE 15

Mapico Tan 10A zinc ferrite pigment from Columbian Chemicals Company was treated with trimethylol ethane according to the procedure shown in Example 10 to produce a zinc ferrite pigment comprising 0.1% by weight trimethylol ethane. A silicone millbase formulation was then prepared using the 0.1% trimethylol ethane treated pigment, reduced, sprayed onto a steel panel, and cured according to the procedures shown in Example 14.

EXAMPLE 16

Mapico Tan 10A zinc ferrite pigment from Columbian Chemicals Company was treated with trimethylol ethane according to the procedure shown in Example 10 to produce a zinc ferrite pigment comprising 0.5% by weight trimethylol ethane. A silicone millbase formulation was then prepared using the 0.5% trimethylol ethane treated pigment, reduced, sprayed onto a steel panel, and cured according to the procedures shown in Example 14.

EXAMPLE 17

Mapico Tan 10A zinc ferrite pigment from Columbian Chemicals Company was treated with trimethylol ethane according to the procedure shown in Example 10 to produce a zinc ferrite pigment comprising 1.0% by weight trimethylol ethane. A silicone millbase formulation was then prepared using the 1.0% trimethylol ethane treated pigment, reduced, sprayed onto a steel panel, and cured according to the procedures shown in Example 14.

EXAMPLE 18

Mapico Tan 10A zinc ferrite pigment from Columbian Chemicals Company was treated with trimethylol ethane according to the procedure shown in Example 10 to produce a zinc ferrite pigment comprising 0.25% by weight trimethylol propane. A silicone millbase formulation was then prepared using the 0.25% trimethylol propane treated pigment, reduced, sprayed onto a steel panel, and cured according to the procedures shown in Example 14.

The dispersion of the zinc ferrite pigments in the cured silicone coatings from Examples 14-18 was measured according to ASTM D-1210-79 using the "PC" scale and the resulting data is shown in Table 2. Higher PC values mean better dispersion. Accordingly, the data in Table 2 indicates that the zinc ferrite treated with trimethylol ethane and trimethylol propane have a greater dispersibility in coatings systems than untreated zinc ferrite.

TABLE 2

| | | P.C. |
|---|---|---|
| Ex. 11 | Control | 8.8 |
| Ex. 12 | 0.1% TME | 9.1 |
| Ex. 13 | 0.5% TME | 9.2 |
| Ex. 14 | 1.0% TME | 9.2 |
| Ex. 15 | 0.25% TMP | 9.2 |

The color change (ΔE) of the cured silicone coatings from Examples 14-18 when subjected to temperatures ranging from 350° F. to 550° F. was measured with a CompuScan spectrophotometer and the results are shown in Table 3. The silicone coatings cured at 300° F. were used as controls for comparative purposes. With only a few exceptions, each indicated by an *, the color changes of the silicone coatings having the surfactant treated zinc ferrites were less than the color changes of the silicone coating having the untreated zinc ferrite. Accordingly, the data in Table 3 further indicates that the addition of surfactants such as trimethylol ethane and trimethylol propane enhances the heat stability of pigments.

TABLE 3

| | | Spectrophotometer Data (0/45 Geometry) | | | | | |
|---|---|---|---|---|---|---|---|
| | | 300° F. | 350° F. | 400° F. | 450° F. | 500° F. | 550° F. |
| Ex. 11 | Control | Control | 0.34 | 0.54 | 1.08 | 2.50 | 3.79 |
| Ex. 12 | 0.1% TME | Control | 0.37* | 0.51 | 1.04 | 2.65* | 3.60 |

TABLE 3-continued

| | | Spectrophotometer Data (0/45 Geometry) | | | | | |
|---|---|---|---|---|---|---|---|
| | | 300° F. | 350° F. | 400° F. | 450° F. | 500° F. | 550° F. |
| Ex. 13 | 0.5% TME | Control | 0.16 | 0.32 | 0.72 | 1.63 | 2.62 |
| Ex. 14 | 1.0% TME | Control | 0.24 | 0.55* | 1.07 | 1.79 | 2.29 |
| Ex. 15 | 0.25 TMP | Control | 0.32 | 0.44 | 0.92 | 1.64 | 2.36 |

EXAMPLE 19

An acrylic millbase formulation comprising Red 257 iron oxide pigment from Columbian Chemicals Company was prepared. 100 gm. of an acrylic pigment carrier comprising 61.8% by weight of AT400 acrylic resin from Rohm and Haas, 29.0 gm. of N-butanol, and 8.2 gm. of cellosolve acetate was weighed into a pint can. 4 oz. of 18-25 mesh glass beads were added to the pint can and the acrylic pigment carrier was stirred at 2000 rpm for 2 minutes. 100 gm. of the red iron oxide pigment was added to the acrylic pigment carrier while the acrylic vehicle was stirred slowly. The acrylic pigment carrier and iron oxide mixture was then milled for 30 minutes at 5000 rpm. The pint can of milled mixture was covered with foil and cooled in water. 200 gm. of let-down comprising 57.86% by weight of AT400, 27.93% by weight of Cymel 325 melamine resin from American Cyanamid, and 14.21% methyl amyl ketone was added to the acrylic pigment carrier and iron oxide mixture in the pint can and the total mixture was stirred at 2000 rpm for 10 minutes.

EXAMPLE 20

Red 257A iron oxide pigment from Columbian Chemicals was treated with trimethylol ethane on a plant scale by spraying a solution of water and trimethylol ethane on the pigment at a rate calculated to add 0.5% trimethylol ethane by weight to the dry iron oxide, mixing the iron oxide and spray until a uniform blend is achieved, and drying the iron oxide. An acrylic 50% pigment millbase formulation was prepared and then let down according to the procedure described in Example 19 except that 100 gm. of the Red 257A treated with 0.5% trimethylol ethane was used.

The dispersion of the pigments in the pigment carriers in Examples 19 and 20 was measured at 10 minute intervals during the milling of the millbase formulations. The dispersion was measured according to ASTM D-1210-79 using the PC scale and is shown in Table 4. The Brookfield viscosity and the Rotovisco viscosity of the millbase formulations were measured at various shear rates and the data is shown in Table 4. The PC values for the millbase formulations having the surfactant treated iron oxide were lower than the PC values for the millbase formulation having the untreated iron oxide but were still relatively high. However, both Brookfield viscosity and the Rotovisco viscosity of the millbase formulations having the surfactant treated iron oxide was substantially lower than that of the millbase formulations having the untreated iron oxide.

TABLE 4

| | Acrylic System 50% Pigment | |
|---|---|---|
| | Ex. 19 Untreated Red Iron Oxide | Ex. 20 Red Iron Oxide Treated With 0.5% TME |
| Dispersion | | |
| 10 min PC | 8.5 | 8.2 |
| 20 min PC | 8.8 | 8.7 |

TABLE 4-continued

| | Acrylic System 50% Pigment | |
|---|---|---|
| | Ex. 19 Untreated Red Iron Oxide | Ex. 20 Red Iron Oxide Treated With 0.5% TME |
| 30 min PC | 9.0 | 8.8 |
| Brookfield Viscosity | | |
| 20 rpm | 600 | 550 |
| 50 rpm | 610 | 560 |
| 100 rpm | 630 | 580 |
| Rotovisco Viscosity | | |
| 68 sec-1 | 1570 | 810 |
| 203 sec-1 | 1250 | 780 |
| 610 sec-1 | 940 | 760 |
| 1830 sec-1 | 860 | 730 |
| 5492 sec-1 | 850 | 700 |
| 10984 sec-1 | 790 | 680 |

EXAMPLE 21

A universal colorant of 65% pigment loading was prepared. First, 350 gm. of Colortrend #822-6530 universal pigment carrier from Nuodex, Inc. was poured into a Cowles mixer. 600 gm. of Red 257A iron oxide pigment from Columbian Chemicals was added spoonwise to the pigment carrier and the mixture was stirred slowly until the pigment was wetted. The mixture was then mixed in the mixer at 4500 rpm for 20 minutes.

EXAMPLE 22

A universal colorant of 65% pigment loading was prepared as in Example 21 except that the Red 257A iron oxide pigment was treated with 0.5% by weight of trimethylol ethane. The treated iron oxide pigment was prepared as described in Example 20.

The dispersion of the red iron oxide pigments in the colorants from Examples 21 and 22 was measured according to ASTM D-1210-79 at 10 minute intervals during mixing. The Hegman Scale was used and the values are shown in Table 5. The Brookfield viscosity and the Rotovisco viscosity of the colorants from Examples 21 and 22 were measured at various shear rates and the results are also shown in Table 5. The Hegman values in Table 5 do not show improved dispersion as a result of the surfactant treatment; however, the Hegman values for the colorant treated with surfactant are relatively high. The viscosity of the colorant having the surfactant treated pigment was significantly reduced relative to the colorant having the untreated pigment.

TABLE 5

| | Nuodex Universal System 65% Pigment | |
|---|---|---|
| | Ex. 21 Untreated Iron Oxide | Ex. 22 Iron Oxide Treated With 0.5% TME |
| 10 Min. dispersion | | |
| Clean (Heg) | 4.5 | 4.5 |
| Grind (Heg) | 6.0 | 5.75 |

TABLE 5-continued
Nuodex Universal System 65% Pigment

|  | Ex. 21 Untreated Iron Oxide | Ex. 22 Iron Oxide Treated With 0.5% TME |
| --- | --- | --- |
| Temp. (C) | 50 | 45 |
| 20 Min. dispersion |  |  |
| Clean (Heg) | 4.5 | 4.5 |
| Grind (Heg) | 6.0 | 6.0 |
| Temp. (C) | 55 | 54 |
| Brookfield Viscosity |  |  |
| 20 rpm | 10900 | 6720 |
| 50 rpm | 5380 | 3470 |
| 100 rpm | 3370 | 2150 |
| Rotovisco Viscosity |  |  |
| 68 sec-1 | 3130 | 2190 |
| 203 sec-1 | 1360 | 1040 |
| 610 sec-1 | 560 | 450 |
| 1830 sec-1 | 380 | 300 |
| 5492 sec-1 | 350 | 260 |

EXAMPLE 23

A universal colorant of 60% pigment loading was prepared. First, 400 gm. of Colortrend #822-6530 universal concentrate from Nuodex, Inc. was poured into a Cowles mixer. 600 gm. of yellow 1075A iron oxide pigment from Columbian Chemicals was added spoonwise to the pigment carrier and the mixture was stirred slowly until the pigment was wetted. The mixture was then mixed in the Cowles mixer for 20 minutes.

EXAMPLE 24

A universal colorant of 60% pigment loading was prepared as in Example 23 except that the yellow 1075A iron oxide pigment was treated with 0.5% by weight trimethylol ethane. The treated iron oxide pigment was prepared as described in Example 20.

The dispersion of the yellow iron oxide pigments in the colorants from Examples 21 and 24 was measured according to ASTM D-1210-79 at 5 minute intervals during mixing. The Hegman Scale was used and the values are shown in Table 6. Higher Hegman values indicate better dispersion; therefore, the Hegman values in Table 6 indicate that the surfactant treatment improved the dispersion of the yellow iron oxide in the colorants. The Brookfield viscosity and the Rotovisco viscosity of the colorants from Examples 23 and 24 were measured at various shear rates and the results are shown in Table 5. The viscosity of the colorants having the surfactant treated pigment was significantly reduced relative to the colorant having the untreated pigment.

TABLE 6
Nuodex Universal System 60% Pigment

|  | Ex. 23 Untreated Iron Oxide | Ex. 24 Iron Oxide Treated With 0.5% TME |
| --- | --- | --- |
| 5 Min. dispersion |  |  |
| Clean (Heg) | 5.5 | 6.3 |
| Grind (Heg) | 6.5 | 6.8 |
| 10 Min. dispersion |  |  |
| Clean (Heg) | 6.0 | 6.3 |
| Grind (Heg) | 6.5 | 6.8 |
| Brookfield Viscosity |  |  |
| 20 rpm | 16120 | 11780 |
| 50 rpm | 9290 | 6370 |
| 100 rpm | 5370 | 4040 |
| Rotovisco Viscosity |  |  |
| 68 sec-1 | 4700 | 3130 |
| 136 sec-1 | 2660 | 1880 |
| 203 sec-1 | 1980 | 1360 |
| 407 sec-1 | 1410 | 990 |
| 610 sec-1 | 1250 | 870 |
| 1220 sec-1 | 1150 | 840 |

While the invention has been described in detail with particular reference to the disclosed embodiments, it is to be understood that variations and modifications may be utilized without departing from the principles and scope of the invention as defined by the following claims.

We claim:

1. A pigment dispersion of enhanced viscosity and heat stability characteristics for use in coatings systems, the pigment dispersion comprising:
   a water-based pigment carrier dispersable in coatings systems;
   a iron oxide pigment dispersed in said pigment carrier; and
   a surfactant selected from the group consisting of trimethylol ethane and trimethylol propane which is functional as a dispersant in a relatively nonpolar matrix and which is present on the surface of the pigment in an amount effective to enhance the dispersibility of said pigment and the viscosity and heat stability characteristics of said pigment dispersion.

2. A pigment dispersion as in claim 1, wherein the water-based carrier comprises a polyhydric alcohol.

3. A pigment dispersion as in claim 2, wherein the polyhydric alcohol is selected from the group consisting of ethylene glycol and propylene glycol.

4. A pigment dispersion as in claim 1, wherein said pigment is selected from the group consisting of red iron oxide, yellow iron oxide, and black iron oxide.

5. A pigment dispersion as in claim 4, wherein said pigment has a BET surface area of about 3 to about 20 square meters per gram.

6. A pigment dispersion as in claim 1, wherein said surfactant is present in an amount of about 0.1% to about 1% by weight of the pigment.

7. A pigment dispersion as in claim 1, wherein said surfactant is present in an amount of about 0.3 to about 0.5% by weight of the pigment.

* * * * *